(12) United States Patent
Okuma et al.

(10) Patent No.: US 12,393,391 B2
(45) Date of Patent: Aug. 19, 2025

(54) CUSTOMER SERVICE SUPPORTING DEVICE, SELF-SERVICE TERMINAL, AND METHOD

(71) Applicant: Toshiba Tec Kabushiki Kaisha, Tokyo (JP)

(72) Inventors: Yumiko Okuma, Tokyo (JP); Mayuko Tsunoda, Yokohama Kanagawa (JP); Hikaru Koganezawa, Kawasaki Kanagawa (JP); Junji Nakamura, Tokyo (JP); Tetuhiro Nobutoki, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/582,635

(22) Filed: Feb. 20, 2024

(65) Prior Publication Data

US 2024/0354045 A1 Oct. 24, 2024

(30) Foreign Application Priority Data

Apr. 19, 2023 (JP) .................. 2023-068568

(51) Int. Cl.
| | |
|---|---|
| *G06F 3/14* | (2006.01) |
| *A47F 9/04* | (2006.01) |
| *G06Q 20/18* | (2012.01) |
| *G06Q 30/015* | (2023.01) |

(52) U.S. Cl.
CPC ............ *G06F 3/1454* (2013.01); *A47F 9/047* (2013.01); *G06Q 20/18* (2013.01); *G06Q 30/015* (2023.01)

(58) Field of Classification Search
CPC ..... G06F 3/1454; G06Q 30/015; G06Q 20/18
USPC ...................................... 235/383, 375, 382.5
See application file for complete search history.

(56) References Cited

FOREIGN PATENT DOCUMENTS

| | | | |
|---|---|---|---|
| CN | 103905555 A | * | 7/2014 |
| JP | 2004303057 A | * | 10/2004 |
| JP | 2007241796 A | * | 9/2007 |
| JP | 4922691 B2 | * | 4/2012 |
| JP | 2020-039756 A | | 3/2020 |
| JP | 2021-153294 A | | 9/2021 |
| KR | 20230007080 A | * | 1/2023 |

* cited by examiner

*Primary Examiner* — Edwyn Labaze
(74) *Attorney, Agent, or Firm* — Kim & Stewart LLP

(57) ABSTRACT

A customer service supporting device includes a communication interface configured to communicate with a self-service terminal in a store and an operator terminal in a location different from the store, and a processor configured to, upon receipt of a customer service request from the self-service terminal, acquire screen data corresponding to a screen that is displayed by the self-service terminal when the customer service request is issued, and control the communication interface to transmit the screen data to the operator terminal and cause the operator terminal to display the screen.

14 Claims, 14 Drawing Sheets

YYYYMMDD hh:mm

"PLEASE INPUT NUMBER OF USERS"

[ − ] [ 0 ] [ + ]

ANSWER YOUR
QUESTIONS

700

"ARE THERE ANY CUSTOMERS UNDER 20 YEARS OLD?"

[ YES ]   [ NO ]

"PLEASE INPUT NUMBER OF CUSTOMERS UNDER 20 YEARS OLD"

| UNDER 6 YEARS OLD | [−] [0] [+] | 13 TO 15 YEARS OLD | [−] [0] [+] |
| 7 TO 12 YEARS OLD | [−] [0] [+] | 16 TO 19 YEARS OLD | [−] [0] [+] |

"DRINK ALCOHOL?"

[ YES ]   [ NO ]

[ STOP ]   [ RETURN ]   [ OK ]

FIG. 14

```
                                    Da
┌─────────────────────────────────────────────┐
│ YYYYMMDD hh:mm                              │
│                                             │
│         "PLEASE INPUT NUMBER OF USERS"      │
│                                             │
│              [ − ] [ 0 ] [ + ]              │
│                                             │
│      "ARE THERE ANY CUSTOMERS UNDER 20 YEARS OLD?"│
│                                             │
│              [ YES ]      [ NO ]            │
│                                             │
│   "PLEASE INPUT NUMBER OF CUSTOMERS UNDER 20 YEARS OLD" │
│                                             │
│   UNDER 6    [−][0][+]   13 TO 15   [−][0][+] │
│   YEARS OLD              YEARS OLD          │
│   7 TO 12    [−][0][+]   16 TO 19   [−][0][+] │
│   YEARS OLD              YEARS OLD          │
│                                             │
│               "DRINK ALCOHOL?"              │
│                                             │
│              [ YES ]      [ NO ]            │
│                                             │
├─────────────────────────────────────────────┤
│ KARAOKE BOX ○○ STORE     [MEMBER INFORMATION]│
└─────────────────────────────────────────────┘
         │                              │
        901                            902
```

CUSTOMER SERVICE SUPPORTING DEVICE, SELF-SERVICE TERMINAL, AND METHOD

CROSS-REFERENCE TO RELATED APPLICATION

This application is based upon and claims the benefit of priority from Japanese Patent Application No. 2023-068568, filed Apr. 19, 2023, the entire contents of which are incorporated herein by reference.

FIELD

Embodiments described herein relate generally to a customer service supporting device, a self-service terminal, and a method.

BACKGROUND

In recent years, an increasing number of stores selling commodities or providing services are equipped with self-service terminals, which are operable by customers to make payment for the sold commodities or the provided services, to achieve automatic operation or labor saving. However, since the self-service terminals are operated by customers, it is necessary to respond to inquiries from customers having trouble operating the self-service terminals. Therefore, employees need to be stationed in the stores to respond to the inquiries, and providing the self-service terminals does not actually lead to self-service operation levels or labor saving that might be expected.

Such a problem can be solved by introducing a remote customer service system that makes it possible to provide customer service from a remote location through a monitor. However, in order to introduce the remote customer service system, a monitor for customer service is required separately from a self-service terminal. Also, unless a person providing customer service from the remote location can recognize operations that are difficult for the customers, it is not possible to provide highly satisfactory customer service.

BRIEF DESCRIPTION OF THE DRAWINGS

FIG. 8 shows an example of a screen displayed on a touch panel of the self-service terminal.

FIG. 14 shows an example of a screen displayed on a display of the operator terminal.

DETAILED DESCRIPTION

An aspect of this disclosure makes it possible to provide a customer service supporting device that can provide highly satisfactory remote customer service to a customer having trouble operating a self-service terminal without using a monitor for customer service and a self-service terminal supported by the customer service supporting device.

According to an aspect of this disclosure, a customer service supporting device includes a communication interface configured to communicate with a self-service terminal in a store and an operator terminal in a location different from the store, and a processor configured to, upon receipt of a customer service request from the self-service terminal, acquire screen data corresponding to a screen that is displayed by the self-service terminal when the customer service request is issued, and control the communication interface to transmit the screen data to the operator terminal and cause the operator terminal to display the screen.

Schematic Description of Remote Customer Service System

Figure 1:
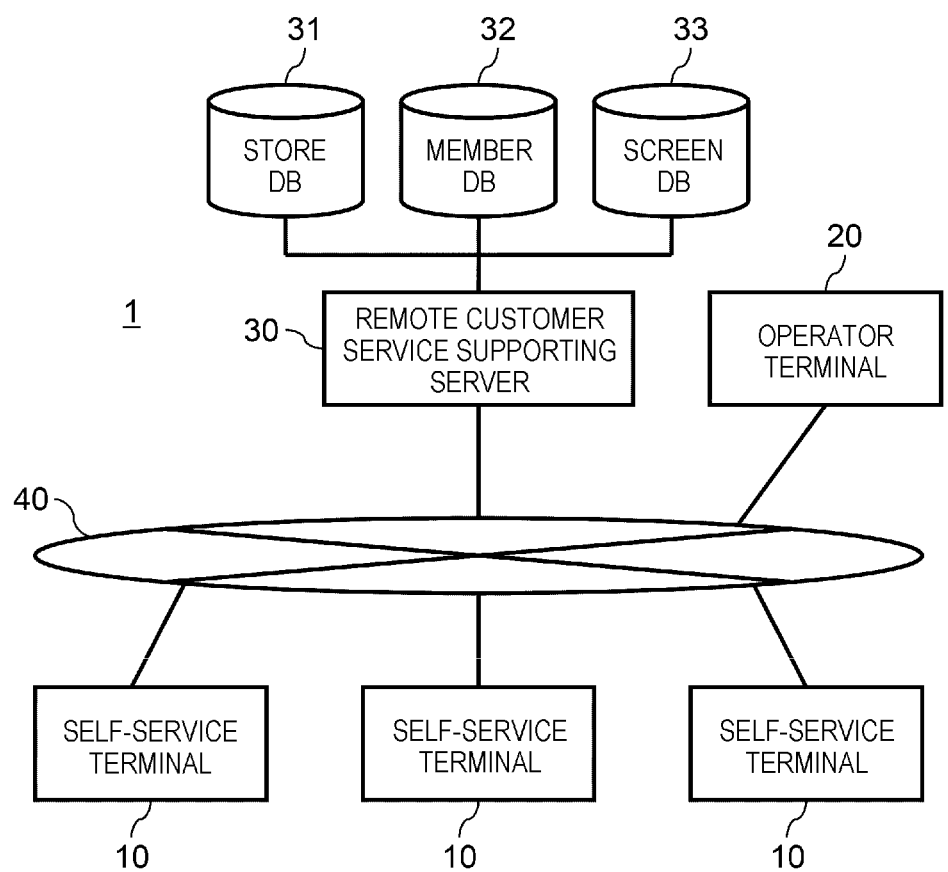
FIG. 1 is a block diagram showing a schematic configuration of a remote customer service system according to an embodiment.

FIG. 1 is a block diagram showing a schematic configuration of a remote customer service system 1 according to an embodiment. The remote customer service system 1 includes self-service terminals 10, an operator terminal 20, and a remote customer service supporting server 30. The self-service terminals 10 are provided in a store where the remote customer service system 1 is introduced.

The store sells commodities or provides services. For example, the store is a self-service checkout type retail store where a customer collects commodities to be purchased from commodities displayed on a sales floor and operates a self-service POS terminal placed on a checkout counter (a cash register) by himself or herself to pay a price. The store may be a self-service order type restaurant where a customer operates a self-service order terminal placed on a dining table by himself or herself to order a menu item and pay a price thereof. The store may be a facility, such as a karaoke room, a conference room, a guest room, or a fitness club, that is rented out to a customer and in which the customer operates a self-service reception terminal placed on a reception counter by himself or herself to check in when entering the store and to check out when leaving the store. The store may be a rental shop where an article, such as an automobile, a bicycle, or clothing, is rented out to a customer, and the customer operates a self-service reception terminal placed on a reception counter by himself or herself to check out and return the article and make payment.

The self-service POS terminal, the self-service order terminal, and the self-service reception terminal described above are examples of the self-service terminals 10. In the present embodiment, it is assumed that each self-service terminal 10 is a self-service reception terminal provided in a karaoke store in which a customer himself/herself performs a check-in operation when entering the store and performs a checkout operation when leaving the store. The self-service terminals 10 are provided in each of chain stores. The number of self-service terminals 10 provided in each store is not limited to any specific value. Each store may be provided with one self-service terminal 10 or two or more self-service terminals 10.

As shown in FIG. 1, in the remote customer service system 1, the self-service terminals 10, the operator terminal 20, and the remote customer service supporting server 30 are connected to each other via a communication network 40. The communication network 40 enables two-way data communication among the self-service terminals 10, the operator terminal 20, and the remote customer service supporting server 30. The communication network 40 enables a voice call between an operator of each self-service terminal 10 and an operator of the operator terminal 20. For example, a wide area network, such as the Internet, or a mobile communication network is adopted as the communication network 40.

As described above, the self-service terminal 10 is provided in a karaoke store in which a customer himself/herself performs a check-in operation when entering the store and performs a checkout operation when leaving the store. Therefore, the operator of the self-service terminal 10 is a karaoke room user who visits the karaoke store. On the other hand, the operator terminal 20 is provided in an office in a remote location away from the karaoke store. In the office, there is an employee who is responsible for remotely serving customers who visit the karaoke store. Hereinafter, the employee is referred to as a customer service person. That is, the operator of the operator terminal 20 is a customer service person.

The remote customer service supporting server 30 is an example of a customer service supporting device that supports remote customer service performed by the customer service person for a customer who operates the self-service terminal 10. The remote customer service supporting server 30 may provide services related to remote customer service in an on-premises environment, or may provide services related to remote customer service in a cloud computing environment.

The remote customer service supporting server 30 manages a store database 31, a member database (or customer database) 32, and a screen database 33. The store database 31, the member database 32, and the screen database 33 may be stored in a storage device provided in the remote customer service supporting server 30 or may be stored in an external storage device connected to the remote customer service supporting server 30.

The store database 31 is a collection of store data records generated for each karaoke store. In each store data record, store information, such as a store name and a location, is associated with a store ID that is store identification information for identifying the karaoke store.

The member database 32 is a collection of member data records generated for respective customers who are registered as members of the karaoke store. In each member data record, member information, such as name, age, gender, and use history, is associated with a member ID that is member identification information (or customer identification information) for identifying the corresponding member (or customer).

The screen database 33 is a collection of screen data records generated for respective screens to be displayed on a display device of the self-service terminal 10. In each screen data record, screen information, such as the name of a screen and a default image, is associated with a screen ID that is screen identification information (or image identification information) for identifying the screen. The default image is displayed on the screen when no input operation has been performed by a customer who is the operator of the self-service terminal 10.

Here, an example of transition of screens displayed on the display device of the self-service terminal 10 will be described with reference to a schematic diagram of FIG. 2.

The self-service terminal 10 is an information terminal that processes check-in to the store and checkout from the store. When the self-service terminal 10 is in an idle state, a start screen Aa identified by a screen ID "0001" is displayed on the display device. The start screen Aa includes a reception button for selecting check-in and a checkout button for selecting checkout. A customer who checks in touches the reception button. A customer who checks out touches the checkout button.

When the reception button is touched, the self-service terminal 10 enters a check-in mode. When entering the check-in mode, the screen of the display device transitions to a member registration screen Ba identified by a screen ID "1001". The member registration screen Bb is a screen for a customer who is registered as a member to input member information such as a member ID. The member registration screen Bb is also a screen for a customer who is not registered as a member to input information necessary for member registration. When the member information or the information necessary for the member registration is input on the member registration screen Bb, the screen of the display device transitions to a number-of-persons input screen Bb identified by a screen ID "1002". The number-of-persons input screen Bb is a screen for a customer to input the number of persons who use a karaoke room. When the number of persons is input on the number-of-persons input screen Bb, the screen of the display device transitions to a price list screen Bc identified by a screen ID "1003". The price list screen Bc is a screen on which a price list, which include prices that vary depending on conditions such as karaoke courses and karaoke rooms, is displayed. After checking the price list, the customer touches an acceptance button. When the acceptance button is touched, the screen of the display device transitions to a course selection screen Bd identified by a screen ID "1004". The course selection screen Bd is a screen for selecting a karaoke course. The karaoke store provides multiple karaoke courses that differ in, for example, whether an all-you-can-drink option is provided and a usage time. When a course selected by the customer is input on the course selection screen Bd, the screen of the display device transitions to a room selection screen Be identified by a screen ID "1005". The room selection screen Be is a screen for selecting a karaoke room. The karaoke store, for example, provides multiple karaoke rooms with different room sizes, acoustic facilities, lighting facilities, and the like. When a karaoke room selected by the customer is input on the room selection screen Be, the screen of the display device transitions to a reception check screen Bf identified by a screen ID "1006". The reception check screen Bf displays the number of persons, the karaoke room, and use information for the karaoke room, which are received from the number-of-persons input screen Bb, the course selection screen Bd, and the room selection screen Be, and the price corresponding to the use information. After checking items of the reception check screen Bf, the customer touches an acceptance button. After the acceptance button is touched, the screen of the display device transitions to a reception end screen Bg identified by a screen ID "1007". The reception end screen Bg is a screen indicating that the check-in is finished.

On the other hand, when the checkout button on the start screen Aa is touched, the self-service terminal 10 enters a checkout mode. When entering the checkout mode, the screen of the display device transitions to a slip input screen Ca identified by a screen ID "2001". The slip input screen Ca is a screen for a customer to input a slip number of a checkout slip issued when checking in. When the slip number of the checkout slip is input on the slip input screen Ca, the screen of the display device transitions to a coupon input screen Cb identified by a screen ID "2002". The coupon input screen Cb is a screen for a customer to input information related to a coupon. A customer who has a coupon or the like inputs information regarding the coupon at this time. A customer who does not have a coupon or the like touches a skip button. After the information related to the coupon is input or the skip button is touched, the screen of the display device transitions to a checkout check screen Cc identified by a screen ID "2003". The checkout check screen Cc displays information for checkout such as a payment amount. After checking the information on the checkout, the customer touches an acceptance button. When the acceptance button is touched, the screen of the display device transitions to a payment method screen Cd identified by a screen ID "2004". The payment method screen Cd is a screen for selecting a price payment method such as cash, a credit card, an electronic money card, or code payment. After the payment method selected by the customer is input on the payment method screen Cd, the screen of the display device transitions to a payment reception screen Ce identified by a screen ID "2005". The payment reception screen Ce is a screen for receiving a payment of a price by the payment method selected by the customer. When the payment of the price is completed, the screen of the display device transitions to a payment end screen Cf identified by a screen ID "2006". The payment end screen Cf is a screen indicating that the checkout is finished.

Figure 2:
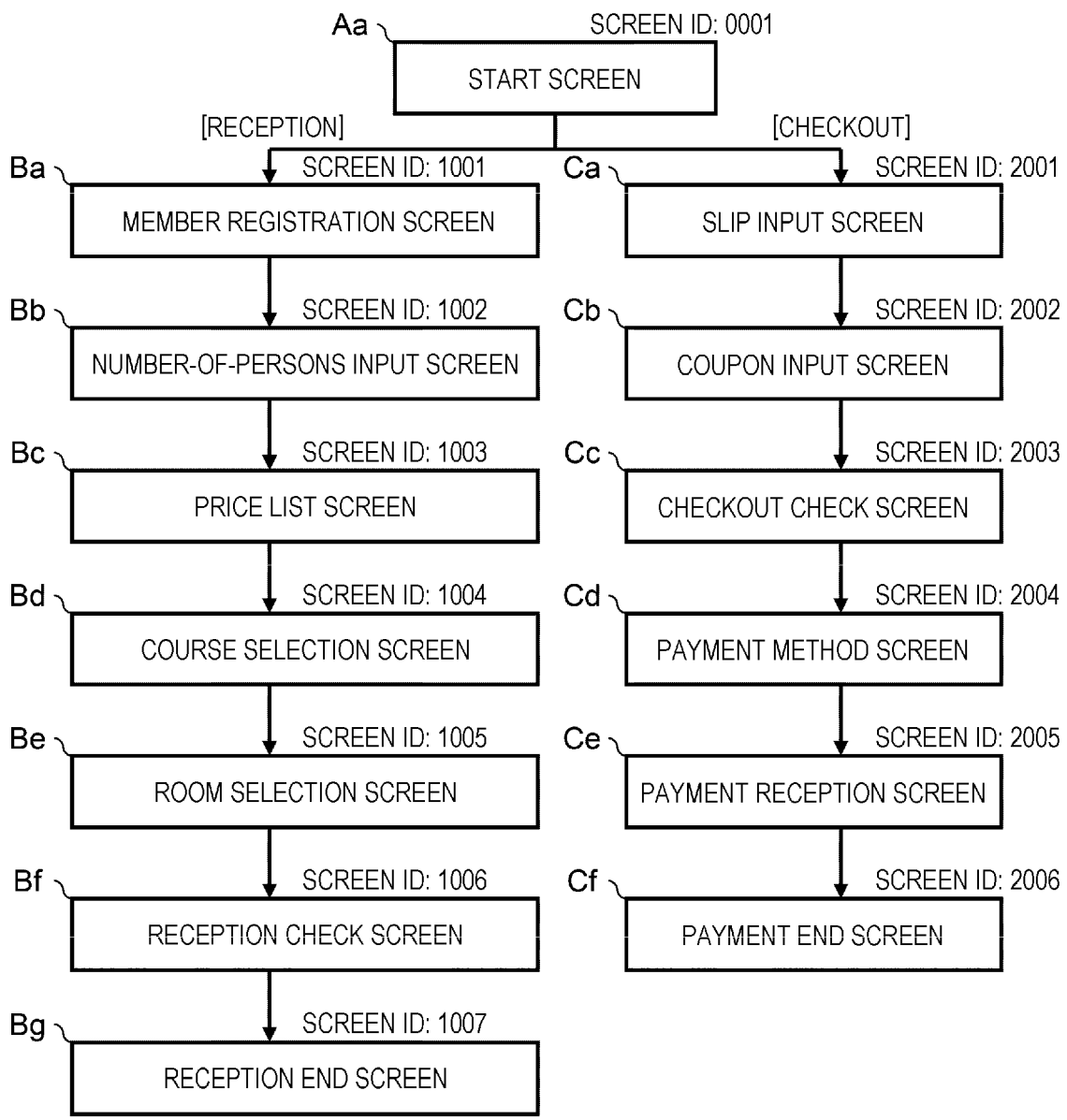
FIG. 2 is a diagram showing an example of transition of screens displayed on a display device of a self-service terminal.

The transition of screens is not limited to that shown in FIG. 2. Other screens may be interposed between the above screens, or some of the screens may be omitted. Each of the number-of-persons input screen Bc, the course selection screen Bd, and the room selection screen Be may be comprised of two or more screens that are switched in response to inputs. Each screen in the check-in mode and the checkout mode may include a return button that causes the screen to return to the previous screen and a stop button that causes the screen to return to the start screen Aa.

Description of Configuration of Self-service Terminal

Figure 3:
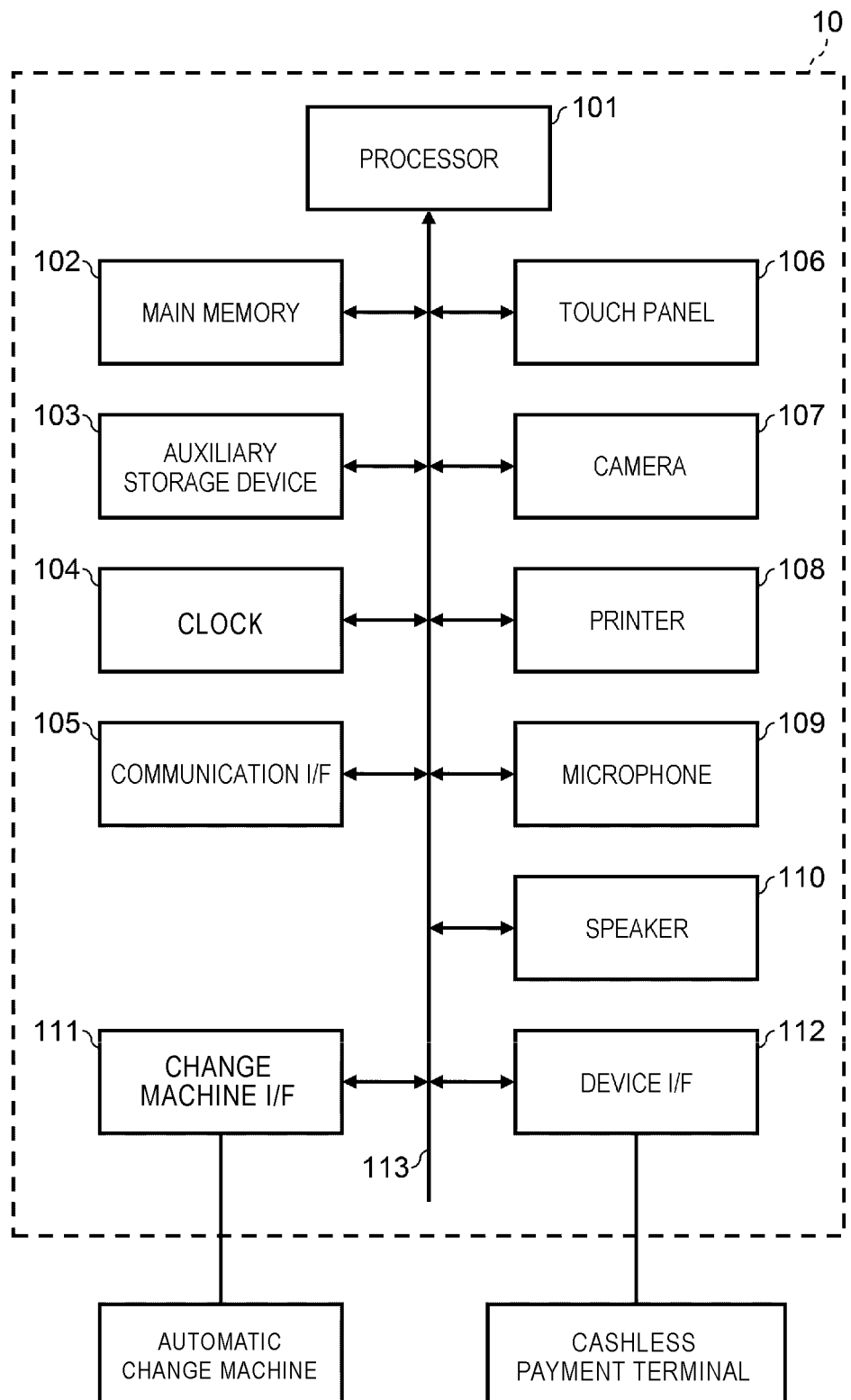
FIG. 3 is a block diagram showing a circuit configuration of the self-service terminal.

FIG. 3 is a block diagram showing a circuit configuration of the self-service terminal 10. The self-service terminal 10 includes a processor 101, a main memory 102, an auxiliary storage device 103, a clock 104, a communication interface (I/F) 105, a touch panel 106, a camera 107, a printer 108, a microphone 109, a speaker 110, a change machine interface (I/F) 111, a device interface (I/F) 112, and a system transmission line 113. The system transmission line 113 includes an address bus, a data bus, a control signal line, and the like. The system transmission line 113 connects the processor 101 and other components to each other and transmits data signals exchanged therebetween.

In the self-service terminal 10, the processor 101, the main memory 102, the auxiliary storage device 103, the clock 104, and the communication interface 105 are connected to each other via the system transmission line 113 to implement a computer. In the self-service terminal 10, the touch panel 106, the camera 107, the printer 108, the microphone 109, the speaker 110, the change machine interface 111, and the device interface 112 are connected to the system transmission line 113 and are controlled by the computer to implement the functions of the self-service terminal 10.

The processor 101 corresponds to a central unit of the computer. The processor 101 controls the other components according to an operating system or application programs in order to implement various functions of the self-service terminal 10. The processor 101 is, for example, a central processing unit (CPU). The processor 101 is a multicore processor including a plurality of processor cores and capable of executing a plurality of processes in parallel.

The main memory 102 corresponds to a main storage unit of the computer. The main memory 102 includes a nonvolatile memory area and a volatile memory area. The main memory 102 stores the operating system or the application programs in the nonvolatile memory area. The main memory 102 may store, in the nonvolatile or volatile memory area, data necessary for the processor 101 to execute processes for controlling the other components. In the main memory 102, the volatile memory area is used as a work area where data is rewritten as appropriate by the processor 101. The nonvolatile memory area is, for example, a read-only memory (ROM). The volatile memory area is, for example, a random access memory (RAM).

The auxiliary storage device 103 corresponds to an auxiliary storage unit of the computer. For example, an electric erasable programmable read-only memory (EEPROM), a hard disk drive (HDD), or a solid state drive (SSD) may be used as the auxiliary storage device 103. The auxiliary storage device 103 stores data used by the processor 101 to perform various processes, data generated by the processes performed by the processor 101, and the like. The auxiliary storage device 103 may store the application programs described above.

The clock 104 measures date and time. The processor 101 uses the date and time measured by the clock 104 as the present date and time.

The communication interface 105 enables data communication with the remote customer service supporting server 30 connected via the communication network 40. The communication interface 105 also establishes a voice call with the operator terminal 20 via the communication network 40.

The touch panel 106 functions as a display device and an input device of the self-service terminal 10. The camera 107 is an imaging device that captures an image of a customer who operates the self-service terminal 10. The camera 107 is also a reading device that reads a bar code or the like printed on a checkout slip. The printer 108 is a printing device that prints checkout slip data and the like on recording paper. The microphone 109 and the speaker 110 are used for voice communication between a customer service person, who is the operator of the operator terminal 20 with which a voice call is established, and a customer, who is the operator of the self-service terminal 10. The change machine interface 111 is an interface with an automatic change machine 51 used for cash payment. The device interface 112 is an interface with a cashless payment terminal 52 used for cashless payment such as credit card payment, electronic money payment, or code payment.

Description of Configuration of Operator Terminal

Figure 4:
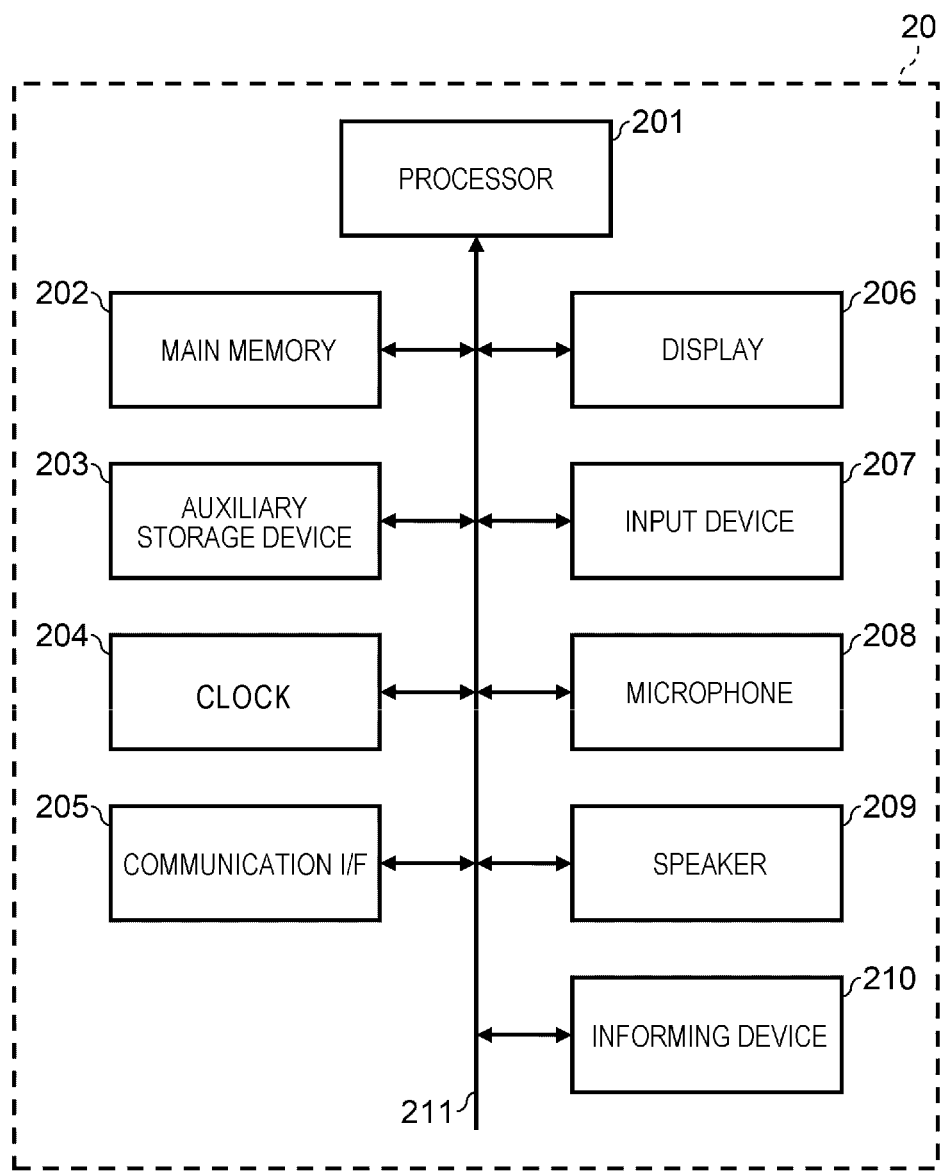
FIG. 4 is a block diagram showing a circuit configuration of an operator terminal.

FIG. 4 is a block diagram showing a circuit configuration of the operator terminal 20. The operator terminal 20 includes a processor 201, a main memory 202, an auxiliary storage device 203, a clock 204, a communication interface (I/F) 205, a display 206, an input device 207, a microphone 208, a speaker 209, an informing device 210, and a system transmission line 211. The system transmission line 211 includes an address bus, a data bus, a control signal line, and the like. The system transmission line 211 connects the processor 201 and other components to each other and transmits data signals exchanged therebetween.

In the operator terminal 20, the processor 201, the main memory 202, the auxiliary storage device 203, the clock 204, and the communication interface 205 are connected to each other via the system transmission line 211 to implement a computer. In the operator terminal 20, the display 206, the input device 207, the microphone 208, the speaker 209, and the informing device 210 are connected to the system transmission line 211 and are controlled by the computer to implement the functions of the operator terminal 20.

The processor 201 corresponds to a central unit of the computer. The processor 201 controls the other components according to an operating system or application programs in order to implement various functions of the operator terminal 20. The processor 201 is, for example, a CPU. The processor 201 is a multicore processor including a plurality of processor cores and capable of executing a plurality of processes in parallel.

The main memory 202 corresponds to a main storage unit of the computer. The main memory 202 includes a nonvolatile memory area and a volatile memory area. The main memory 202 stores the operating system or the application programs in the nonvolatile memory area. The main memory 202 may store, in the nonvolatile or volatile memory area, data necessary for the processor 201 to execute processes for controlling the other components. In the main memory 202, the volatile memory area is used as a work area where data is rewritten as appropriate by the processor 201. The nonvolatile memory area is, for example, a ROM. The volatile memory area is, for example, a RAM.

The auxiliary storage device 203 corresponds to an auxiliary storage unit of the computer. For example, an EEPROM, an HDD, or an SSD may be used as the auxiliary storage device 203. The auxiliary storage device 203 stores data used by the processor 201 to perform various processes, data generated by the processes performed by the processor 201, and the like. The auxiliary storage device 203 may also store the application programs described above.

The clock 204 measures date and time. The processor 201 uses the date and time measured by the clock 204 as the present date and time.

The communication interface 205 enables data communication with the remote customer service supporting server 30 connected via the communication network 40. The communication interface 205 also establishes a voice call with the self-service terminal 10 via the communication network 40.

The display 206 functions as a display device of the operator terminal 20. The input device 207 is a pointing device such as a mouse. The input device 207 may also be a keyboard, a touch pad, or the like. The microphone 208 and the speaker 209 are used for voice communication between a customer, who is the operator of the self-service terminal 10 with which a voice call is established, and a customer service person, who is the operator of the operator terminal 20. The informing device 210 notifies the customer service person that a request for remote customer service has been received by, for example, sounding a buzzer, turning on a light source, or causing a light source to blink.

Description of Configuration of Remote Customer Service Supporting Server

Figure 5:
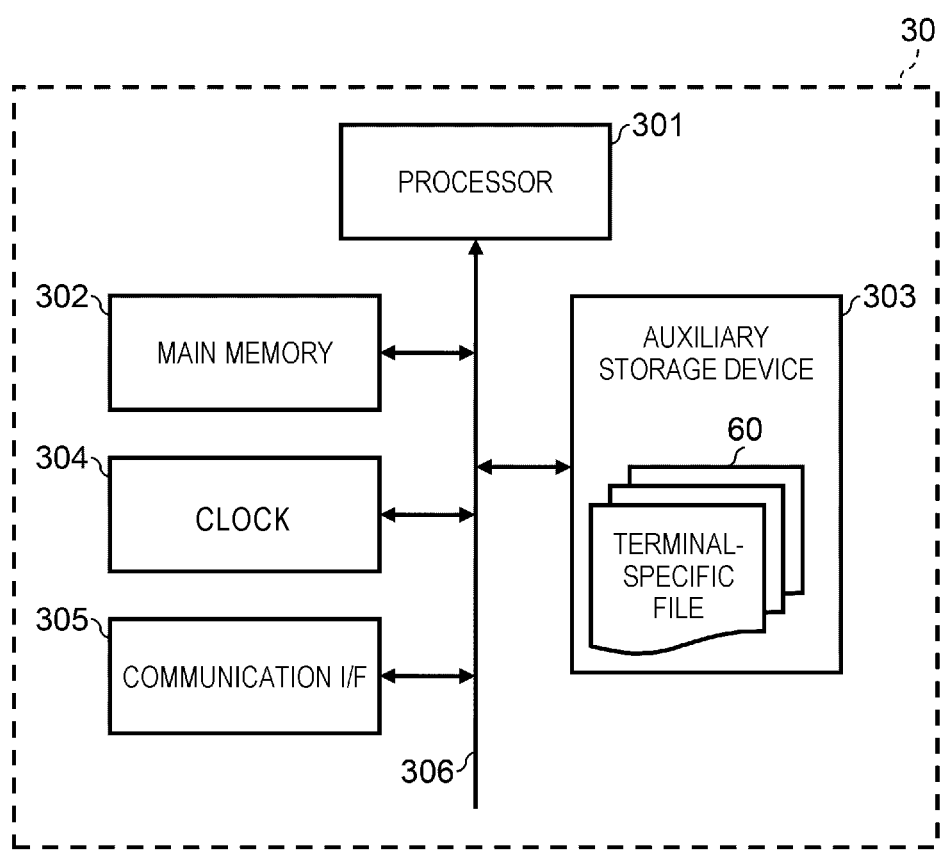
FIG. 5 is a block diagram showing a circuit configuration of a remote customer service supporting server.

FIG. 5 is a block diagram showing a circuit configuration of the remote customer service supporting server 30. The remote customer service supporting server 30 includes a processor 301, a main memory 302, an auxiliary storage device 303, a clock 304, a communication interface (I/F) 305, and a system transmission line 306. The system transmission line 306 includes an address bus, a data bus, a control signal line, and the like. The system transmission line 306 connects the processor 301 and other components to each other and transmits data signals exchanged therebetween.

In the remote customer service supporting server 30, the processor 301, the main memory 302, the auxiliary storage device 303, the clock 304, and the communication interface 305 are connected to each other via the system transmission line 306 to implement a computer. The functions of the remote customer service supporting server 30 can be implemented by the computer.

The processor 301 corresponds to a central unit of the computer. The processor 301 controls the other components according to an operating system or application programs in order to implement various functions of the remote customer service supporting server 30. The processor 301 is, for example, a CPU. The processor 301 is a multicore processor including a plurality of processor cores and capable of executing a plurality of processes in parallel.

The main memory 302 corresponds to a main storage unit of the computer. The main memory 302 includes a nonvolatile memory area and a volatile memory area. The main memory 302 stores the operating system or the application programs in the nonvolatile memory area. The main memory 302 may store, in the nonvolatile or volatile memory area, data necessary for the processor 301 to execute processes for controlling the other components. In the main memory 302, the volatile memory area is used as a work area where data is rewritten as appropriate by the processor 301. The nonvolatile memory area is, for example, a ROM. The volatile memory area is, for example, a RAM.

The auxiliary storage device 303 corresponds to an auxiliary storage unit of the computer. For example, an EEPROM, an HDD, or an SSD may be used as the auxiliary storage device 303. The auxiliary storage device 303 stores data used by the processor 301 to perform various processes, data generated by the processes performed by the processor 301, and the like. The auxiliary storage device 303 may also store the application programs described above.

The clock 304 measures date and time. The processor 301 uses the date and time measured by the clock 304 as the present date and time.

The communication interface 305 enables data communication with the self-service terminal 10 and the operator terminal 20 that are connected via the communication network 40.

In the remote customer service supporting server 30 having the configuration described above, a part of a storage area of the auxiliary storage device 303 is used as a storage area for a terminal-specific file 60. The terminal-specific file 60 is created for each self-service terminal 10 connected via the communication network 40 and is stored in the auxiliary storage device 303. The storage area for the terminal-specific file 60 may be the volatile memory area in the main memory 302.

Figure 6:
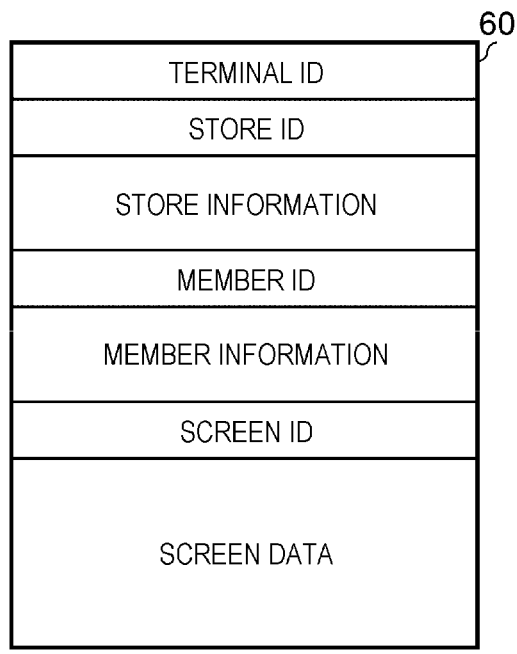
FIG. 6 is a schematic diagram showing a structure of data stored in a terminal-specific file.

FIG. 6 is a schematic diagram showing a structure of data stored in the terminal-specific file 60. As shown in FIG. 6, the terminal-specific file 60 stores a terminal ID, a store ID, store information, a member ID, member information, a screen ID, and screen data. The terminal ID is terminal identification information assigned to each self-service terminal 10 to identify the self-service terminal 10. The store ID is store identification information for identifying a store where the self-service terminal 10 is provided. Each self-service terminal 10 stores the terminal ID and the store ID in the nonvolatile memory area of the main memory 102. Alternatively, each self-service terminal 10 may store the terminal ID and the store ID in the auxiliary storage device 303. The store information is information about a store and is recorded in the store database 31 in association with the store ID. The member ID is member identification information for identifying a member registered in the self-service terminal 10. The member information is information related to a member as recorded in the member database 32 in association with the member ID. The screen ID is screen identification information for identifying a screen displayed on the touch panel 106, which is a display device of the self-service terminal 10. The screen data is data of a screen identified by the screen ID. The screen data may be information related to a screen as recorded in the screen database 33 or a still image captured by the self-service terminal 10.

Description of Functions of Remote Customer Service System

Figure 7:
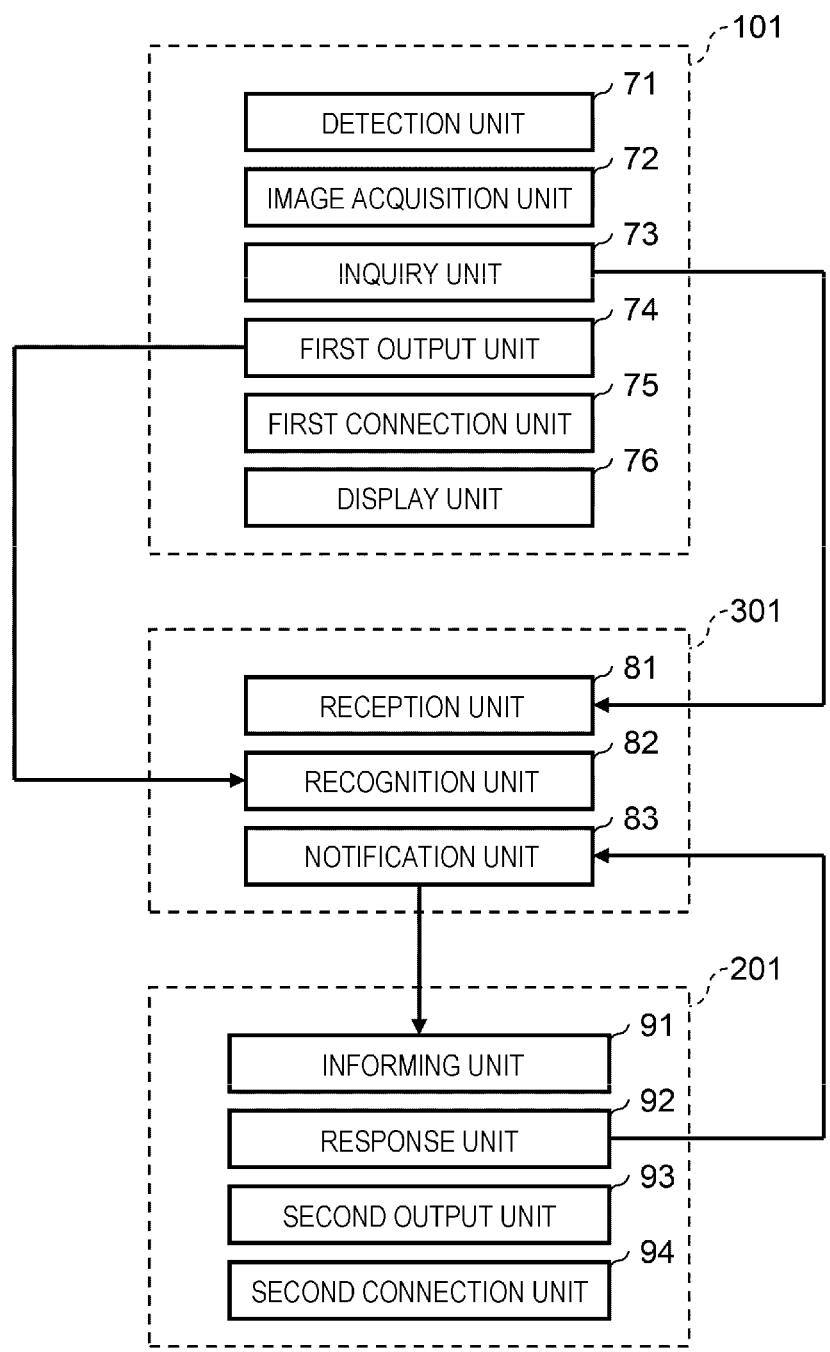
FIG. 7 is a block diagram showing functional configurations of processors of the self-service terminal, the remote customer service supporting server, and the operator terminal.

FIG. 7 is a block diagram showing functional configurations of the processor 101 of the self-service terminal 10, the processor 301 of the remote customer service supporting server 30, and the processor 201 of the operator terminal 20. As shown in FIG. 7, the processor 101 of the self-service terminal 10 includes, as functional units, a detection unit 71, an image acquisition unit 72, an inquiry unit 73, a first output unit 74, a first connection unit 75, and a display unit 76. The processor 301 of the remote customer service supporting server 30 includes, as functional units, a reception unit 81, a recognition unit 82, and a notification unit 83. The processor 201 of the operator terminal 20 includes, as functional units, an informing unit 91, a response unit 92, a second output unit 93, and a second connection unit 94.

In the self-service terminal 10, the detection unit 71 has a function of detecting a customer service request input via an input device (i.e., the touch panel 106) by a customer who operates the self-service terminal 10. The image acquisition unit 72 has a function of acquiring information related to an image that is displayed on the display device, that is, the touch panel 106, of the self-service terminal 10 when the customer service request is detected by the detection unit 71. The inquiry unit 73 has a function of sending, to the customer service supporting device, that is, the remote customer service supporting server 30, an inquiry about whether to permit the customer service request. That is, the processor 101 controls the communication interface 105 to send the inquiry to the remote customer service supporting server 30. The first output unit 74 has a function of outputting information related to the image acquired by the image acquisition unit 72 to the remote customer service supporting server 30. That is, the processor 101 controls the communication interface 105 to send the information related to the image to the remote customer service supporting server 30. The first connection unit 75 has a function of establishing a voice call with the operator terminal 20 used by the operator in charge of customer service when a response to permit the customer service request is received from the remote customer service supporting server 30 in response to the inquiry made by the inquiry unit 73. That is, the processor 101 controls the communication interface 105 to establish a voice call with the operator terminal 20. The display unit 76 has a function of superimposing, on an image displayed on the display device, a window image that displays, in a window frame, the operator of the operator terminal 20 with which the voice call has been established. That is, the processor 101 controls the display device, i.e., the touch panel 106, to display the window image.

The functions of the detection unit 71, the image acquisition unit 72, the inquiry unit 73, the first output unit 74, the first connection unit 75, and the display unit 76 described above are implemented by the processor 101 of the self-service terminal 10 by performing information processing according to a self-service terminal program. The self-service terminal program is a type of application software installed in the main memory 102 or the auxiliary storage device 103 of the self-service terminal 10. The method for installing the self-service terminal program in the main memory 102 or the auxiliary storage device 103 is not particularly limited. The self-service terminal program may be recorded on a removable recording medium or distributed by communication via a network and installed in the main memory 102 or the auxiliary storage device 103. Any recording medium, such as a CD-ROM or a memory card, may be used as the removable recording medium as long as the recording medium can store a program and can be read by a device.

In the remote customer service supporting server 30, the reception unit 81 has a function of receiving a customer service request from the self-service terminal 10 being operated by a customer. That is, the processor 301 controls the communication interface 305 to receive a customer service request from the self-service terminal 10. The recognition unit 82 has a function of recognizing, based on the customer service request, a still image that is displayed on the touch panel 106 of the self-service terminal 10 at a time point when the customer service request is received by the reception unit 81. The notification unit 83 has a function of transmitting the still image recognized by the recognition unit 82 to the operator terminal 20. That is, the processor 301 controls the communication interface 305 to transmit the still image to the operator terminal 20.

The functions of the reception unit 81, the recognition unit 82, and the notification unit 83 described above are implemented by the processor 301 of the remote customer service supporting server 30 by performing information processing according to a customer service supporting program. The customer service supporting program is a type of application software installed in the main memory 302 or the auxiliary storage device 303 of the remote customer service supporting server 30. The method for installing the customer service supporting program in the main memory 302 or the auxiliary storage device 303 is not particularly limited. The customer service supporting program may be recorded on a removable recording medium or distributed by communication via a network and installed in the main memory 302 or the auxiliary storage device 303. Any recording medium, such as a CD-ROM or a memory card, may be used as the removable recording medium as long as the recording medium can store a program and can be read by a device.

In the operator terminal 20, the informing unit 91 has a function of notifying a customer service person, who is an operator of the operator terminal 20, that a customer service request has been received from a customer who operates the self-service terminal 10. The response unit 92 has a function of outputting, to the remote customer service supporting server 30, a response indicating that the customer service person has agreed to provide customer service in response to the customer service request. The second output unit 93 has a function of outputting information related to the self-service terminal 10 when the customer service request is received. The second output unit 93 outputs, for example, information about a store. The second output unit 93 outputs, for example, information related to a member. The second connection unit 94 has a function of establishing a voice call with the self-service terminal 10 from which the customer service request is received.

The functions of the informing unit 91, the response unit 92, the second output unit 93, and the second connection unit 94 described above are implemented by the processor 201 of the operator terminal 20 by performing information processing according to an operator terminal program. The operator terminal program is a type of application software installed in the main memory 202 or the auxiliary storage device 203 of the operator terminal 20. The method for installing the operator terminal program in the main memory 202 or the auxiliary storage device 203 is not particularly limited. The operator terminal program may be recorded on a removable recording medium or distributed by communication via a network and installed in the main memory 202 or the auxiliary storage device 203. Any recording medium, such as a CD-ROM or a memory card, may be used as the removable recording medium as long as the recording medium can store a program and can be read by a device.

Figure 9:
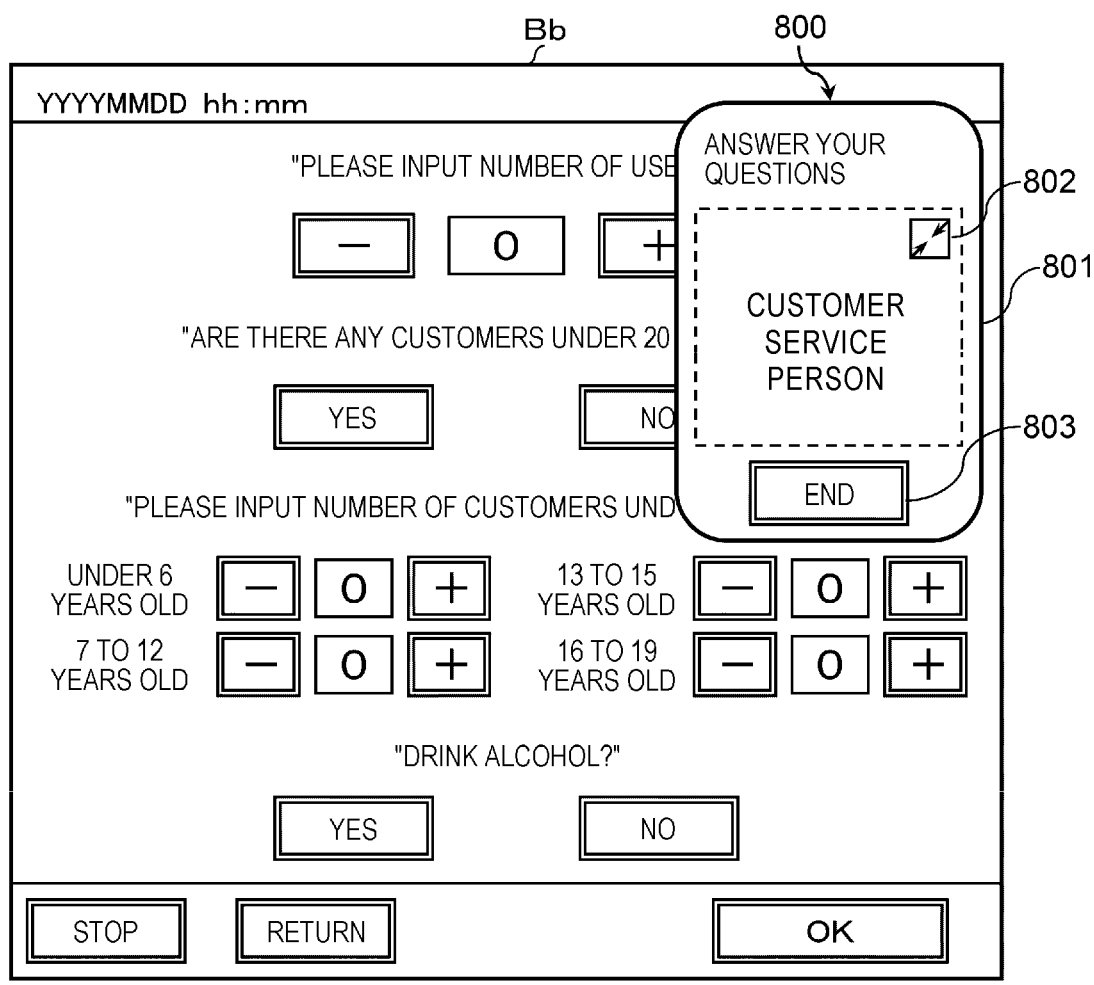
FIG. 9 shows an example of a screen displayed on the touch panel of the self-service terminal.
Figure 10:
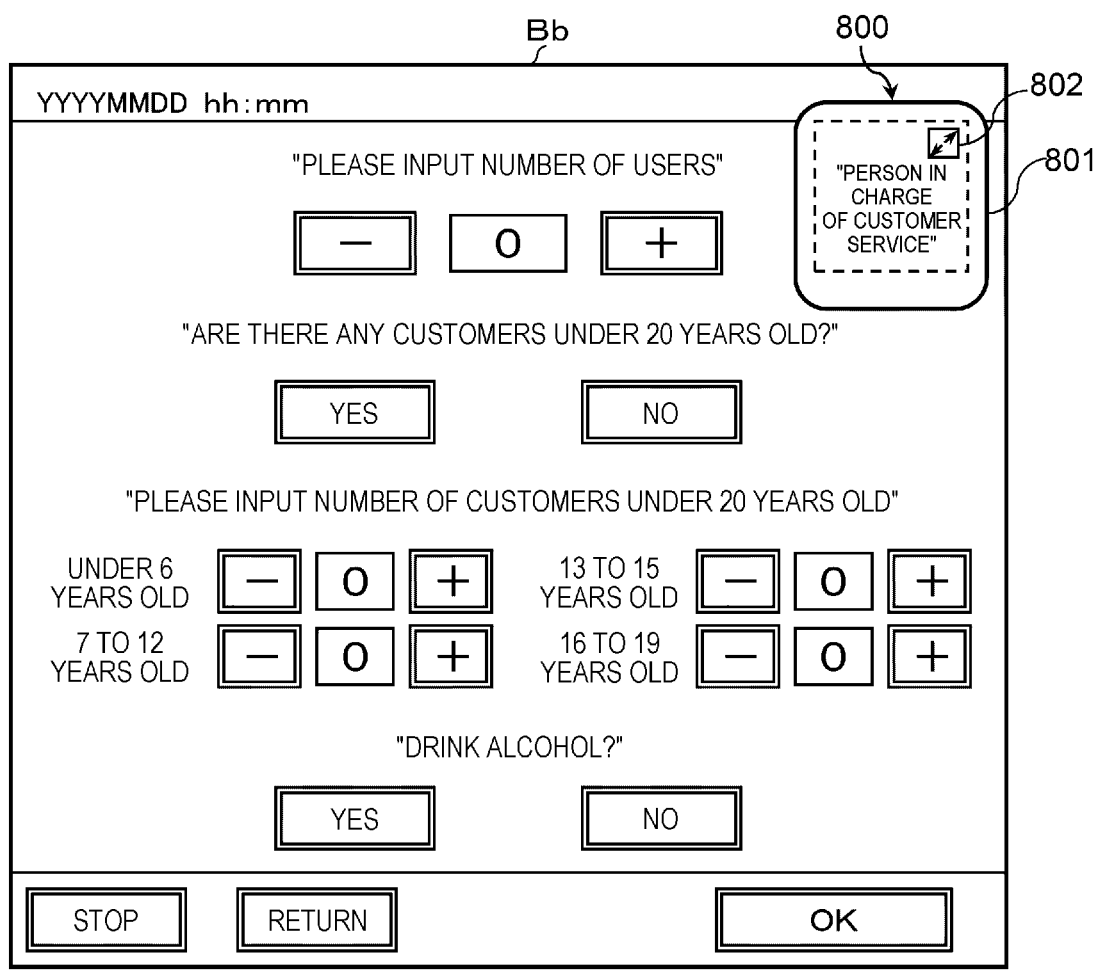
FIG. 10 shows an example of a screen displayed on the touch panel of the self-service terminal.
Figure 11:
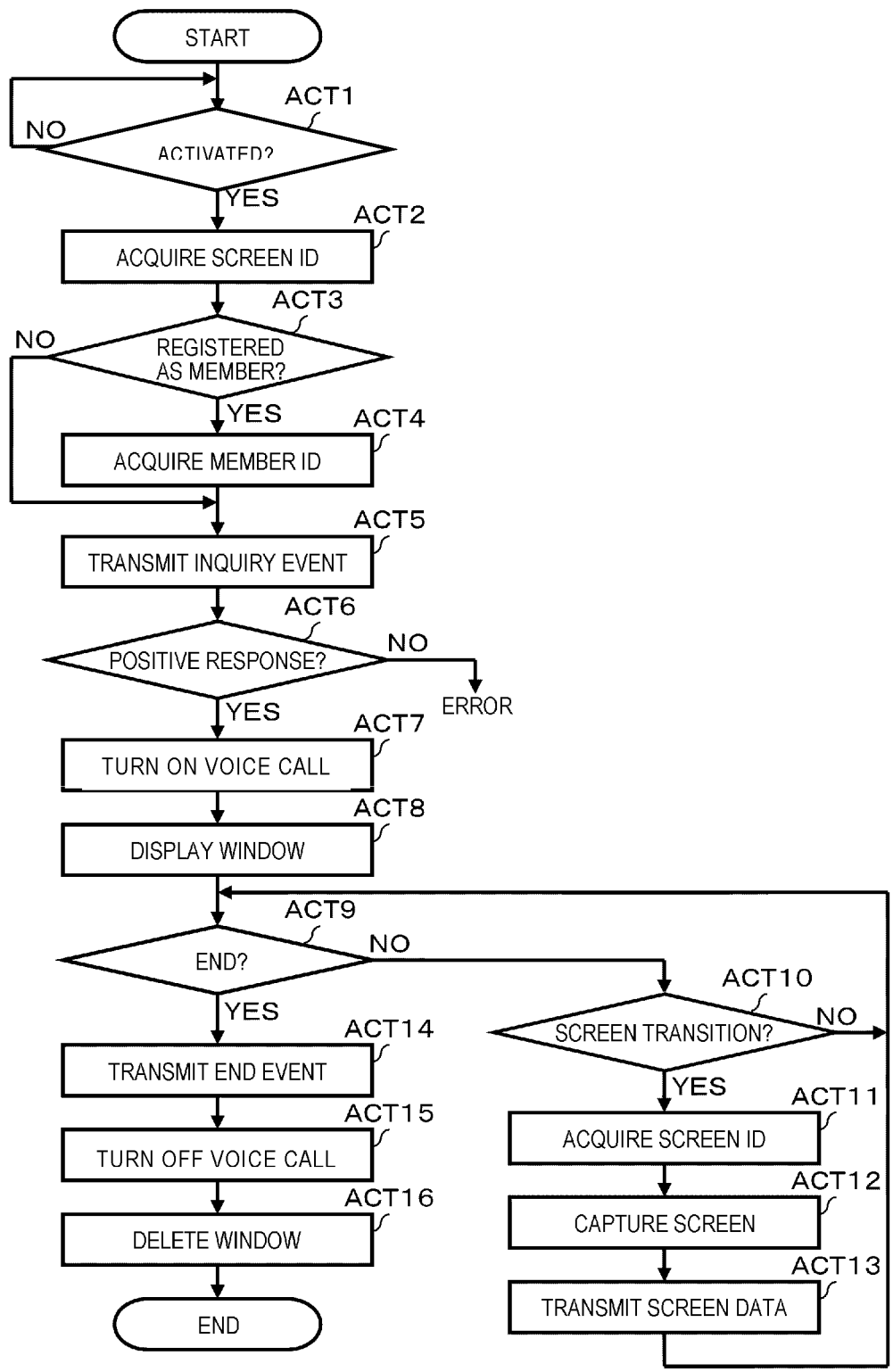
FIG. 11 is a flowchart showing information processing executed by the processor of the self-service terminal.
Figure 12:
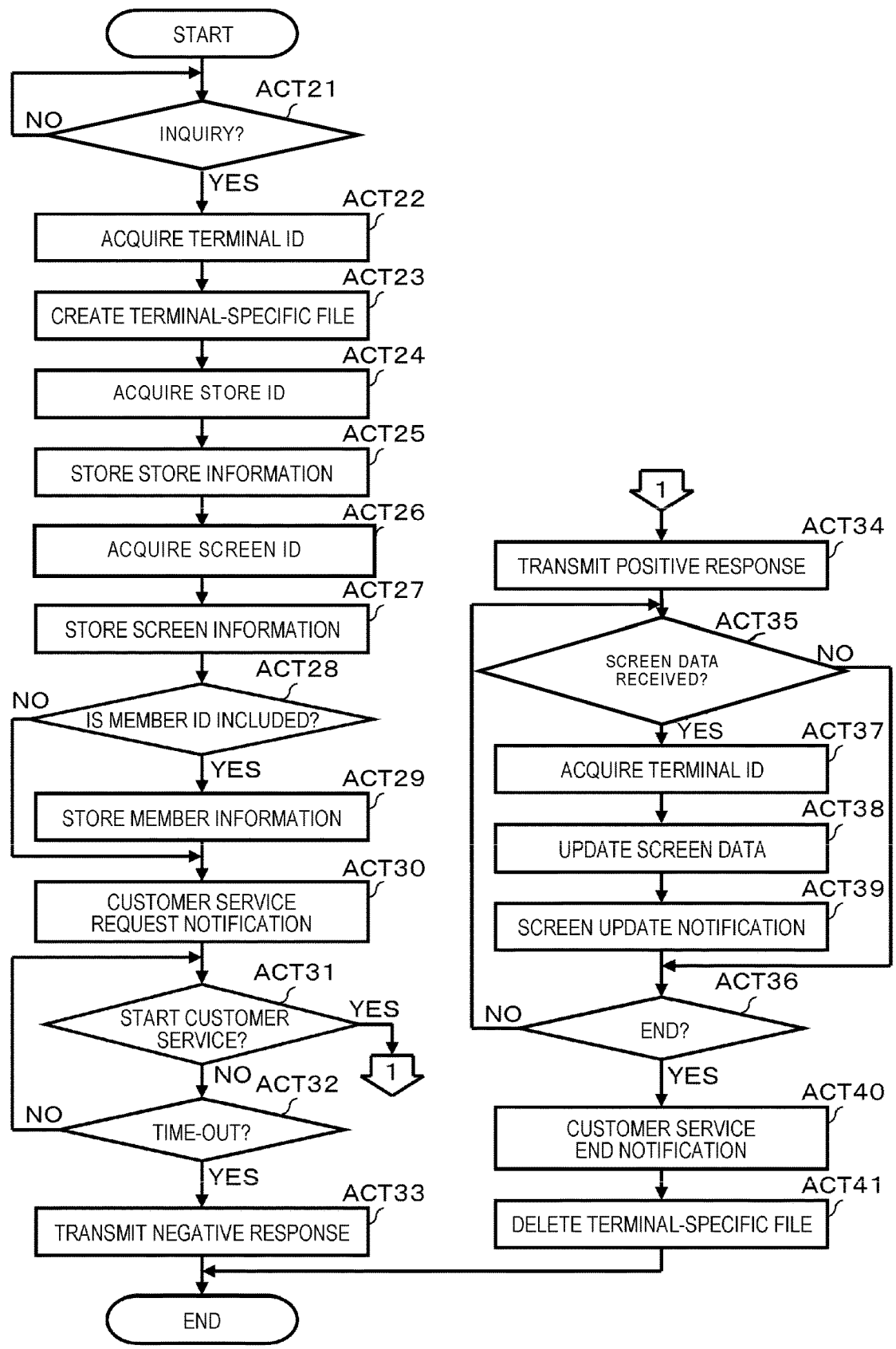
FIG. 12 is a flowchart showing information processing executed by the processor of the remote customer service supporting server.
Figure 13:
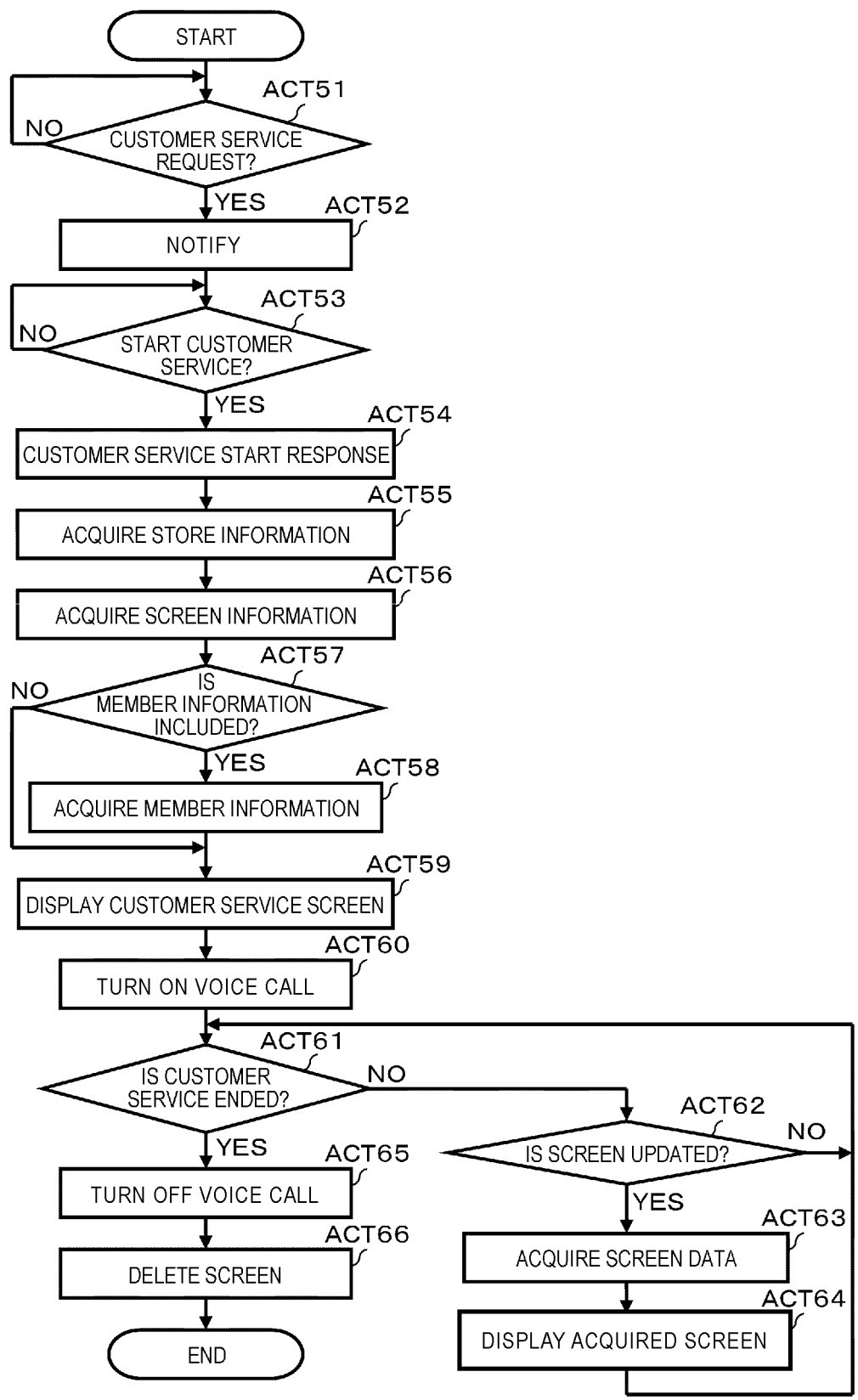
FIG. 13 is a flowchart showing information processing executed by the processor of the operator terminal.

FIGS. 8 to 10 are examples of screens displayed on the touch panel 106 of the self-service terminal 10. FIG. 11 is a flowchart showing information processing performed by the processor 101 of the self-service terminal 10. FIG. 12 is a flowchart showing information processing performed by the processor 301 of the remote customer service supporting server 30. FIG. 13 is a flowchart showing information processing performed by the processor 201 of the operator terminal 20. FIG. 14 is an example of a screen displayed on the display 206 of the operator terminal 20. Below, functions of the remote customer service system 1 will be described with reference to the drawings. The information processing described below is an example. The information processing may be changed as appropriate as long as the same effect can be achieved. Also, screen layouts and the like may be changed as appropriate.

FIG. 8 is an example of the number-of-persons input screen Bb displayed on the touch panel 106 in the check-in mode. As shown in FIG. 8, the number-of-persons input screen Bb is divided into a region for inputting the number of persons who use the karaoke room, a region for checking whether minors are included, a region for inputting the number of minors in each age group, and a region for checking whether to drink alcohol. The number-of-persons input screen Bb also includes an OK button which is an acceptance button, a stop button, and a return button. After finishing inputting necessary items on the number-of-persons input screen Bb, the customer touches the OK button. The customer who desires to return to the previous screen, that is, the member registration screen Ba, touches the return button. The customer who desires to stop the check-in touches the stop button.

An activation button 700 for requesting remote customer service is disposed on the number-of-persons input screen Bb having the configuration described above. The activation button 700 is a software key. The activation button 700 is an example of an operation element operated by a customer who desires to make an inquiry to a store clerk about the screen operation. The screen on which the activation button 700 is disposed is not limited to the number-of-persons input screen Bb. The activation button 700 may be provided on all of the start screen Aa, the screens Ba to Bg in the check-in mode, and the screens Ca to Cf in the checkout mode. If it is considered that there is no inquiry about the operation of the start screen Aa, the activation button 700 may not be provided on the start screen Aa. Similarly, if it is assumed that there is no inquiry about the operations of the reception end screen Bg and the payment end screen Cf, the activation button 700 may not be provided on the reception end screen Bg and the payment end screen Cf.

As shown in FIG. 11, in ACT 1, the processor 101 of the self-service terminal 10 waits for the activation button 700 to be touched. When the activation button 700 is touched, the processor 101 recognizes that a customer service request has been received from the customer who operates the self-service terminal 10. The processor 101 proceeds to ACT 2. In ACT 2, the processor 101 acquires the screen ID of the screen currently being displayed on the touch panel 106. For example, when the activation button 700 disposed on the number-of-persons input screen Bb shown in FIG. 8 is touched, the processor 101 acquires the screen ID "1002".

When the process of ACT 2 is finished, the processor 101 proceeds to ACT 3. In ACT 3, the processor 101 determines whether member registration has been performed. When the member registration has been performed according to an operation input on the member registration screen Ba, the processor 101 proceeds to ACT 4. In ACT 4, the processor 101 acquires the member ID input by the member registration. On the other hand, when the member registration has not been performed, the processor 101 skips the process of ACT 4.

When the process of ACT 4 is finished or skipped, the processor 101 proceeds to ACT 5. In ACT 5, the processor 101 controls the communication interface 105 to transmit an inquiry event (or a customer service request). As a result, the inquiry event is transmitted from the communication interface 105. The inquiry event is transmitted to the remote customer service supporting server 30 via the communication network 40. The inquiry event includes the terminal ID and the store ID that are set in the self-service terminal 10 and the screen ID acquired in the process of ACT 2. When the member ID is acquired in ACT 4, the member ID is also included.

Here, the processor 101 of the self-service terminal 10 implements the function of the detection unit 71 by performing the process of ACT 1 in FIG. 11. The processor 101 implements the function of the image acquisition unit 72 by performing the process of ACT 2. The processor 101 implements the functions of the inquiry unit 73 and the first output unit 74 by performing the process of ACT 5.

As shown in FIG. 12, in ACT 21, the processor 301 of the remote customer service supporting server 30 waits for the inquiry event (or the customer service request). When the inquiry event is received via the communication interface 305, the processor 301 proceeds to ACT 22. In ACT 22, the processor 301 acquires the terminal ID from the inquiry event. In ACT 23, the processor 301 creates the terminal-specific file 60 including the terminal ID, and stores the terminal-specific file 60 in the auxiliary storage device 303.

After finishing the process of ACT 23, the processor 301 proceeds to ACT 24. In ACT 24, the processor 301 acquires the store ID from the inquiry event. In ACT 25, the processor 301 searches the store database 31, acquires store information from a store data record including the store ID, and writes the store information in the terminal-specific file 60. In ACT 26, the processor 301 acquires the screen ID from the inquiry event. Then, in ACT 27, the processor 301 searches the screen database 33, acquires screen information from a screen data record including the screen ID, and writes the screen information in the terminal-specific file 60.

In ACT 28, the processor 301 determines whether a member ID is included in the inquiry event. When the member ID is included, the processor 301 proceeds to ACT 29. In ACT 29, the processor 301 searches the member database 32, acquires member information from a member data record including the member ID, and writes the member information in the terminal-specific file 60. When the member ID is not included in the inquiry event, the processor 301 skips the process of ACT 29.

When the process of ACT 29 is finished or skipped, the processor 301 proceeds to ACT 30. In ACT 30, the processor 301 controls the communication interface 305 to transmit a customer service request notification event. As a result, the customer service request notification event is transmitted via the communication interface 305. The customer service request notification event is transmitted to the operator terminal 20 via the communication network 40. The customer service request notification event includes the terminal ID, the store information, and the screen information, which are stored in the terminal-specific file 60. When the member information is stored in the terminal-specific file 60, the member information is also included in the customer service request notification event.

Here, the processor 301 of the remote customer service supporting server 30 implements the function of the reception unit 81 by performing the process of ACT 21 in FIG. 12. The processor 301 implements the function of the recognition unit 82 by performing the processes of ACT 26 and ACT 27. The processor 301 implements the function of the notification unit 83 by performing the process of ACT 30.

As shown in FIG. 13, in ACT 51, the processor 201 of the operator terminal 20 waits for the customer service request notification event. When the customer service request notification event is received via the communication interface 205, the processor 201 proceeds to ACT 52. In ACT 52, the processor 201 activates the informing device 210. As a result, the informing device 210 notifies the operator that a remote customer service request has been received by, for example, sounding a buzzer, turning on a light source, or causing a light source to blink. After confirming the notification, the customer service person operates the input device 207 to input an instruction to start remote customer service.

After activating the informing device 210, the processor 201 proceeds to ACT 53. In ACT 53, the processor 201 waits for the instruction to start the remote customer service. Upon detecting that the start of the remote customer service is instructed by an input signal from the input device 207, the processor 201 proceeds to ACT 54. In ACT 54, the processor 201 controls the communication interface 205 to transmit a customer service start response command. As a result, the customer service start response command is transmitted from the communication interface 205. The customer service start response command is transmitted to the remote customer service supporting server 30 via the communication network 40.

After controlling the transmission of the customer service start response command, the processor 201 acquires the store information from the customer service request notification event in ACT 55. In ACT 56, the processor 201 acquires the screen information from the customer service request notification event. Further, in ACT 57, the processor 201 determines whether member information is included in the customer service request notification event. When the member information is included in the customer service request notification event, the processor 201 acquires the member information in ACT 58. When the member information is not included in the customer service request notification event, the processor 201 skips the process of ACT 58.

When the process of ACT 58 is finished or skipped, the processor 201 proceeds to ACT 59. In ACT 59, the processor 201 displays the customer service screen Da (see FIG. 14) on the display 206. In ACT 60, the processor 201 turns on a voice call with the self-service terminal 10 identified by the terminal ID included in the customer service request notification event.

FIG. 14 is a display example of the customer service screen Da. The customer service screen Da is displayed when the customer touches the activation button 700 in a state where the number-of-persons input screen Bb (see FIG. 8) is displayed on the touch panel 106 of the self-service terminal 10. As shown in FIG. 14, a default image of the number-of-persons input screen Bb is displayed on the customer service screen Da. A store name 901 included in the store information is displayed on the customer service screen Da. Therefore, from the customer service screen Da, the customer service person can easily recognize the store being used by the customer and the screen being displayed on the self-service terminal 10 when the remote customer service is requested.

A member information button 902 is displayed on the customer service screen Da. The member information button 902 is displayed when the member information is acquired in ACT 58 in FIG. 13. When the member information is not acquired, the member information button 902 is not displayed or grayed out. When the customer service person operates the input device 207 and touches the member information button 902, the member information including, for example, name, age, gender, and use history is displayed on the display 206. Therefore, the customer service person can easily recognize the profile and the use history of the customer who has requested the remote customer service.

Here, the processor 201 of the operator terminal 20 implements the function of the informing unit 91 by performing the process of ACT 52 in FIG. 13. The processor 201 implements the function of the response unit 92 by performing the processes of ACT 53 and ACT 54. The processor 201 implements the function of the second output unit 93 by performing the processes of ACT 55 to ACT 59. The processor 201 implements the function of the second connection unit 94 by performing the process of ACT 60.

Referring back to FIG. 12, after transmitting the customer service request notification event, the processor 301 of the remote customer service supporting server 30 proceeds to ACT 31. In ACT 31, the processor 301 determines whether the customer service start response command has been received. When the customer service start response command has not been received, the processor 301 proceeds to ACT 32. In ACT 32, the processor 301 determines whether the elapsed time after the transmission of the customer service request notification event has reached a predetermined time-out period. When the elapsed time has not reached the time-out period, the processor 301 returns to ACT 31. In this manner, in ACT 31 and ACT 32, the processor 301 waits until the customer service start response command is received or the time-out period elapses.

Even when a request for remote customer service is informed in the office where the operator terminal 20 is provided, the person in charge of customer service may not be able to respond immediately. The operator terminal 20 may be down. In such a case, the time-out period elapses. When the time-out period elapses, the processor 301 proceeds from ACT 32 to ACT 33. In ACT 33, the processor 301 controls the communication interface 305 to transmit a negative response command. As a result, the negative response command is transmitted from the communication interface 305. The negative response command is transmitted via the communication network 40 to the self-service terminal 10, which is the source of the inquiry event. After controlling the transmission of the negative response command, the processor 301 ends the information processing shown in the flowchart of FIG. 12.

On the other hand, when the customer service start response command is received within the time-out period, the processor 301 proceeds from ACT 31 to ACT 34. In ACT 34, the processor 301 controls the communication interface 205 to transmit a positive response command. As a result, the positive response command is transmitted from the communication interface 305. The positive response command is transmitted via the communication network 40 to the self-service terminal 10, which is the source of the inquiry event.

Referring back to FIG. 11, after transmitting the inquiry event, the processor 101 of the self-service terminal 10 enters a standby state to wait for the positive response command in ACT 6. When the negative response command is received via the communication interface 105 in the standby state, the processor 101 determines that an error has occurred and ends the remote customer service. For example, the processor 101 displays, on the touch panel 106, a message "The operator is not available right now. Please wait for a while and then press the activation button", and ends the information processing shown in the flowchart of FIG. 11.

On the other hand, when the positive response command is received via the communication interface 105, the processor 101 proceeds to ACT 7. In ACT 7, the processor 101 turns on a voice call. As a result, the voice call between the operator terminal 20, which has turned on the voice call in ACT 60 in FIG. 13, and the self-service terminal 10 is established, and voice communication is enabled between the customer service person, who is the operator of the operator terminal 20, and the customer, who is the operator of the self-service terminal 10.

Here, the processor 101 of the self-service terminal 10 implements the function of the first connection unit 75 by performing the process of ACT 7 in FIG. 11.

After establishing the voice call with the operator terminal 20, the processor 11 of the self-service terminal 10 proceeds to ACT 8. In ACT 8, the processor 11 superimposes a window image 800 (see FIG. 9) on the screen displayed on the touch panel 106.

FIG. 9 is a diagram showing an example in which the window image 800 is superimposed on the number-of-persons input screen Bb. The window image 800 displays an image of the customer service person within a window frame 801. The image of the customer service person may be an image including the actual face of the customer service person providing the customer service or may be an image of an avatar representing the customer service person. The window image 800 includes a size change icon 802 and an end button 803. The size change icon 802 is an operation element for changing the size of the window frame 801 or the window image 800. The end button 803 is an operation element touched by the customer when ending the remote customer service.

FIG. 9 shows the window image 800 when the size of the window frame 801 is maximum. In this case, a part of the information displayed on the number-of-persons input screen Bb is hidden by the window image 800. Therefore, the customer operates the size change icon 802 to reduce the window frame 801 as shown in FIG. 10. By reducing the window frame 801, the information hidden by the window image 800 becomes visible. When the window frame 801 is reduced, the end button 803 is not displayed. Therefore, in order to end the remote customer service, the customer operates the size change icon 802 to enlarge the window frame 801 as shown in FIG. 9. Then, the customer may touch the end button 803. The window image 800 can also be moved to any position on the screen by a drag operation.

Here, the processor 101 of the self-service terminal 10 implements the function of the display unit 76 by performing the process of ACT 8 in FIG. 11.

Referring back to FIG. 11, after displaying the window image 800, the processor 101 of the self-service terminal 10 proceeds to ACT 9. In ACT 9, the processor 101 determines whether the end button 803 has been touched. When the end button 803 has not been touched, the processor 101 proceeds to ACT 10. In ACT 10, the processor 101 determines whether the transition of screens on the touch panel 106 has occurred. When the transition of screens on the touch panel 106 has not occurred, the processor 101 returns to ACT 9. In this manner, in ACT 9 and ACT 10, the processor 101 waits until the end button 803 is touched or a screen transition occurs.

For example, when the customer finishes inputting the number of persons and the like on the number-of-persons input screen Bb and touches the OK button, the screen of the touch panel 106 transitions to the price list screen Bc. When the screen transition occurs in this manner, the processor 101 proceeds from ACT 10 to ACT 11. In ACT 11, the processor 101 acquires the screen ID of the screen displayed on the touch panel 106. In ACT 12, the processor 101 captures the screen. Then, in ACT 13, the processor 101 controls the communication interface 105 to transmit screen data of the captured screen. As a result, the screen data is transmitted via the communication interface 105. The screen data is transmitted to the remote customer service supporting server 30 via the communication network 40. The screen data includes the terminal ID and the screen ID. After controlling the transmission of the screen data, the processor 101 returns to the standby state in ACT 9 and ACT 10.

When the end button 803 is touched in the standby state in ACT 9 and ACT 10, the processor 101 proceeds from ACT 9 to ACT 14. In ACT 14, the processor 101 controls the communication interface 105 to transmit an end event. As a result, the end event is transmitted from the communication interface 105. The end event is transmitted to the remote customer service supporting server 30 via the communication network 40. The end event includes the terminal ID and the store ID that are set in the self-service terminal 10.

After controlling the transmission of the end event, the processor 101 proceeds to ACT 15. In ACT 15, the processor 101 turns off the voice call. As a result, the voice call with the operator terminal 20 is terminated. In ACT 16, the processor 101 deletes the window image 800 from the screen displayed on the touch panel 106. With this operation, the processor 101 ends the information processing shown in the flowchart of FIG. 11.

Referring back to FIG. 12, after transmitting the positive response in ACT 34, the processor 301 of the remote customer service supporting server 30 proceeds to ACT 35. In ACT 35, the processor 301 determines whether screen data has been received from the self-service terminal 10. When screen data has not been received, the processor 301 proceeds to ACT 36. In ACT 36, the processor 301 determines whether an end event has been received from the self-service terminal 10. When the end event has not been received, the processor 301 returns to ACT 35. In this manner, in ACT 35 and ACT 36, the processor 301 waits until the screen data or the end event is received from the self-service terminal 10.

When the screen data is received via the communication interface 305 in the standby state in ACT 35 and ACT 36, the processor 301 proceeds from ACT 35 to ACT 37. In ACT 37, the processor 301 acquires the terminal ID from the screen data. In ACT 38, the processor 301 updates the screen ID and the screen data in the terminal-specific file 60 including the terminal ID with the screen ID and the screen data received from the self-service terminal 10. In ACT 39, the processor 301 controls transmission of a screen update notification event. As a result, the screen update notification event is transmitted via the communication interface 305. The screen update notification event is transmitted to the operator terminal 20 via the communication network 40. The screen update notification event includes the terminal ID and the screen data stored in the terminal-specific file 60. After controlling the transmission of the screen update notification event, the processor 301 returns to the standby state in ACT 35 and ACT 36.

When the end event is received from the self-service terminal 10 in the standby state in ACT 35 and ACT 36, the processor 301 proceeds from ACT 36 to ACT 40. In ACT 40, the processor 301 controls the transmission of a customer service end notification event. As a result, the customer service end notification event is transmitted via the communication interface 305. The customer service end notification event is transmitted to the operator terminal 20 via the communication network 40. The customer service end notification event includes the terminal ID stored in the terminal-specific file 60. After controlling the transmission of the customer service end notification event, the processor 301 proceeds to ACT 41. In ACT 41, the processor 301 deletes the terminal-specific file 60 that includes the terminal ID included in the end event. The processor 301 ends the information processing shown in the flowchart of FIG. 12.

Referring back to FIG. 13, after establishing the voice call with the self-service terminal 10 in ACT 60, the processor 201 of the operator terminal 20 proceeds to ACT 61. In ACT 61, the processor 201 determines whether the customer service end notification event has been received. If the customer service end notification event has not been received, the processor 201, in ACT 62, determines whether the screen update event has been received. When the screen update event has not been received, the processor 201 returns to ACT 61. In this manner, in ACT 61 and ACT 62, the processor 201 waits until the customer service end notification event or the screen update event is received.

When the screen update event is received in the standby state in ACT 61 and ACT 62, the processor 201 proceeds from ACT 62 to ACT 63. In ACT 63, the processor 201 acquires the screen data from the screen update event. Then, in ACT 64, the processor 201 updates the image on the customer service screen Da with an image represented by the screen data acquired from the screen update event. As a result, the still image captured by the self-service terminal 10 is displayed on the customer service screen Da.

After updating the image on the customer service screen Da, the processor 201 returns to the standby state in ACT 61 and ACT 62. Therefore, each time a still image is captured by the self-service terminal 10, the image on the customer service screen Da is updated with the captured still image.

When the customer service end event is received in the standby state in ACT 61 and ACT 62, the processor 201 proceeds from ACT 61 to ACT 65. In ACT 65, the processor 201 turns off the voice call with the self-service terminal 10 having the terminal ID included in the customer service end event. In ACT 66, the processor 201 deletes the customer service screen Da. The processor 201 ends the information processing shown in the flowchart of FIG. 13.

Description of Effects of Remote Customer Service System

According to the remote customer service system 1 that functions as described above, when a customer operating the self-service terminal 10 desires to make an inquiry to the store clerk about, for example, the operation of the number-of-persons input screen Bb, the customer touches the activation button 700 displayed on the number-of-persons input screen Bb. As a result, an inquiry event is transmitted from the self-service terminal 10 to the remote customer service supporting server 30. The inquiry event includes the terminal ID and the store ID that are set in the self-service terminal 10 and the screen ID of the number-of-persons input screen Bb. When the customer is a member, the member ID is also included in the inquiry event.

In the remote customer service supporting server 30, after the inquiry event is received, the terminal-specific file 60 including the terminal ID of the self-service terminal 10 is created. Then, a customer service request notification event is transmitted from the remote customer service supporting server 30 to the operator terminal 20. The customer service request notification event includes the terminal ID, the store information related to the store identified by the store ID, and the default image of the number-of-persons input screen Bb identified by the screen ID. When the member ID is included in the inquiry event, the member information related to the member identified by the member ID is also included in the customer service request notification event. The store information, the default image, and the member information are stored in the terminal-specific file 60.

In the operator terminal 20, after the customer service request notification event is received, the informing device 210 is activated. This enables the customer service person to know that a remote customer service has been received. The customer service person inputs an instruction to start remote customer service. Then, a customer service start response command is transmitted from the operator terminal 20 to the remote customer service supporting server 30. Furthermore, a positive response command is transmitted from the remote customer service supporting server 30 to the self-service terminal 10. Then, a voice call is established between the self-service terminal 10 and the operator terminal 20. As a result, the customer service person can provide remote customer service by voice communication with the customer. During the voice communication, the window image 800 is displayed on the touch panel 106 of the self-service terminal 10. In the window image 800, the image of the customer service person is displayed. This configuration makes it possible to eliminate the need for a monitor for customer service.

The window frame 801 of the window image 800 can be reduced, and the window image 800 can be moved to any place on the screen. Therefore, it is possible to easily prevent important information on the screen displayed on the touch panel 106 of the self-service terminal 10 from being hidden by the window image 800.

In the operator terminal 20 in which the start of the remote customer service is instructed, the customer service screen Da is displayed on the display 206. The store information and the default image, which are stored in the terminal-specific file 60, are displayed on the customer service screen Da. Therefore, based on the information on the customer service screen Da, the customer service person can determine the store from which the remote customer service is requested and the screen being viewed by the customer when requesting the remote customer service. When the customer service person touches the member information button 902, the member information stored in the terminal-specific file 60 is displayed on the customer service screen Da. Therefore, the customer service person can provide customer service while referring to, for example, customer history and can provide accurate remote customer service with high customer satisfaction.

When the screen on the touch panel 106 transitions from the number-of-persons input screen Bb to the price list screen Bc, for example, the price list screen Bc is captured by the self-service terminal 10, and the screen data of the captured price list screen Bc is transmitted to the remote customer service supporting server 30. As a result, the image of the number-of-persons input screen Bb displayed on the customer service screen Da on the operator terminal 20 is changed to the image of the price list screen Bc. Therefore, the customer service person can know that the screen is updated as a result of a correct operation performed by the customer.

Here, the image displayed on the operator terminal 20 is a still image captured when the screen is updated on the self-service terminal 10. Therefore, compared to a case where the operator terminal 20 remotely accesses the self-service terminal 10 to capture the image displayed on the touch panel 106 and displays the captured image on the acquisition display 206, the amount of screen data transmitted and received via the communication network 40 is small. In addition, as for the default image, only the screen ID is transmitted from the self-service terminal 10, and the screen data is not transmitted. This makes it possible to further reduce the communication volume.

Other Embodiments

In ACT 2 in FIG. 11, the processor 101 of the self-service terminal 10 may capture a still image of a screen displayed on the touch panel 106 and include the still image in an inquiry event instead of acquiring a screen ID. Also, data transmitted to the remote customer service supporting server 30 in ACT 13 in FIG. 11 may be only the screen ID acquired in ACT 11. That is, it is not necessary to transmit a still image obtained by capturing a screen. In this case, the processor 301 of the remote customer service supporting server 30 searches the screen database 33 in ACT 38 in FIG. 12, acquires screen information corresponding to the received screen ID, and updates screen data in the terminal-specific file 60. Then, the processor 301 transmits a screen update notification event including the terminal ID and the screen data that are stored in the terminal-specific file 60 to the operator terminal 20. In this way, every time the screen displayed on the self-service terminal 10 transitions to another screen, the display 206 of the operator terminal 20 displays a default image of the another screen.

Even with such a configuration, the customer service person can recognize the screen displayed on the self-service terminal 10 and can provide appropriate remote customer service. With this embodiment, since screen data is not transmitted from the self-service terminal 10, the communication volume can be further reduced. In addition, there is an advantage that the screen capturing function of the self-service terminal 10 can be omitted.

The activation button 700 may not be a software key superposed on the screen. For example, when the self-service terminal 10 is provided with a keyboard as an input device, a predetermined key in the keyboard may be used by a customer to make an inquiry to a store clerk about screen operations.

It may also be possible to determine whether the customer is having trouble operating the self-service terminal 10 by processing an image of the customer captured by the camera 107 with artificial intelligence (AI), and the processor 101 may transmit an inquiry command when it is determined that the customer is having trouble operating the self-service terminal 10.

The member information button 902 may display a member name included in the member information. This enables the customer service person to identify a customer who has requested remote customer service by just seeing the customer service screen Da without touching the member information button 902.

The self-service terminals 10 connected to the communication network 40 are not necessarily used for one type of business, such as karaoke stores. For example, self-service terminals used for different types of businesses, such as karaoke stores and car rental stores, may be connected to the communication network 40 so that the customer service person can provide remote customer service not only for self-service terminals provided in karaoke stores but also for self-service terminals provided in car rental stores.

While certain embodiments have been described, the embodiments have been presented by way of example only, and are not intended to limit the scope of the disclosure. Indeed, the novel embodiments described herein may be embodied in a variety of other forms; furthermore, various omissions, substitutions, changes, and combinations in the form of the embodiments described herein may be made without departing from the spirit of the disclosure. The accompanying claims and their equivalents are intended to cover such forms or modifications as would fall within the scope and spirit of the disclosure.

What is claimed is:

1. A customer service supporting device of a store, comprising:
   a communication interface configured to communicate with a self-service terminal and an operator terminal; and
   a processor configured to:
      upon receipt of a customer service request including customer identification information for identifying a customer from the self-service terminal, acquire;
      customer information associated with the customer identification information and
      first screen data corresponding to a first screen that is displayed by the self-service terminal when the customer service request is issued,
      control the communication interface to transmit the first screen data and the customer information to the operator terminal and cause the operator terminal to display the first screen together with a graphical user interface (GUI) object for displaying the customer information, acquire second screen data corresponding to a second screen that is displayed by the self-service terminal in response to an input operation through the first screen, and control the communication interface to transmit the second screen data to the operator terminal and cause the operator terminal to transition from the first screen to the second screen while maintaining the GUI object for displaying the customer information.

2. The customer service supporting device according to claim 1, wherein the processor is configured to acquire, as the first screen data, an image of the first screen that is captured by the self-service terminal when the customer service request is issued.

3. The customer service supporting device according to claim 1, wherein the processor is configured to acquire the first screen data based on image identification information included in the customer service request and identifying the first screen that is displayed by the self-service terminal when the customer service request is issued.

4. The customer service supporting device according to claim 1, wherein the processor is configured to control the communication interface to transmit, to the operator terminal, the first screen data and the customer information together with store information about the store.

5. The customer service supporting device according to claim 4, wherein
the customer service request includes store identification information for identifying the store, and
the processor is configured to search a store database based on the store identification information to acquire the store information about the store.

6. The customer service supporting device according to claim 1, wherein
the processor is configured to search a customer database using the customer identification information to acquire the customer information about the customer.

7. The customer service supporting device according to claim 1, wherein the processor is configured to control the communication interface to transmit, to the operator terminal, the first screen data and the customer information together with terminal identification information for identifying the self-service terminal.

8. A method performed by a customer service supporting device of a store, wherein the customer service supporting device is connected via a communication network to a self-service terminal and an operator terminal, the method comprising:

receiving a customer service request including customer identification information for identifying a customer from the self-service terminal;

acquiring customer information associated with the customer identification information;

acquiring first screen data corresponding to a first screen that is displayed by the self-service terminal when the customer service request is issued;

transmitting the first screen data and the customer information to the operator terminal and causing the operator terminal to display the first screen together with a graphical user interface (GUI) object for displaying the customer information;

acquiring second screen data corresponding to a second screen that is displayed by the self-service terminal in response to an input operation through the first screen; and transmitting the second screen data to the operator terminal and causing the operator terminal to transition from the first screen to the second screen while maintaining the GUI object for displaying the customer information.

9. The method according to claim 8, wherein the first screen data is an image of the first screen that is captured by the self-service terminal when the customer service request is issued.

10. The method according to claim 8, wherein the first screen data is acquired based on image identification information included in the customer service request and identifying the first screen that is displayed by the self-service terminal when the customer service request is issued.

11. The method according to claim 8, wherein the first screen data and the customer information are transmitted to the operator terminal together with store information about the store.

12. The method according to claim 11, further comprising:
searching a store database using store identification information included in the customer service request to acquire the store information about the store.

13. The method according to claim 8, further comprising:
searching a customer database using the customer identification information included in the customer service request to acquire the customer information about the customer.

14. The method according to claim 8, wherein the first screen data and the customer information are transmitted to the operator terminal together with terminal identification information for identifying the self-service terminal.

* * * * *